United States Patent
Okada et al.

(10) Patent No.: US 7,992,671 B2
(45) Date of Patent: Aug. 9, 2011

(54) SADDLE RIDING VEHICLE

(75) Inventors: Megumu Okada, Saitama (JP); Keita Yagi, Saitama (JP); Kihoko Kaita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/697,954

(22) Filed: Feb. 1, 2010

(65) Prior Publication Data
US 2010/0133036 A1 Jun. 3, 2010

Related U.S. Application Data

(62) Division of application No. 11/392,715, filed on Mar. 30, 2006, now Pat. No. 7,665,570.

(30) Foreign Application Priority Data

Mar. 31, 2005 (JP) ................................. 2005-100789
Mar. 31, 2005 (JP) ................................. 2005-101023

(51) Int. Cl.
*B62D 5/04* (2006.01)
(52) U.S. Cl. ...................................................... 180/444
(58) Field of Classification Search .................... 180/444
See application file for complete search history.

(56) References Cited

U.S. PATENT DOCUMENTS

| 5,054,798 A | * | 10/1991 | Zulawski | ......................... 280/16 |
| 7,216,733 B2 | | 5/2007 | Iwami et al. | |
| 7,311,170 B2 | | 12/2007 | Isoda et al. | |
| 7,600,603 B2 | * | 10/2009 | Okada et al. | ................... 180/444 |
| 7,644,939 B2 | * | 1/2010 | Tomita | .............................. 280/89 |
| 7,775,318 B2 | * | 8/2010 | Okada et al. | ................... 180/444 |
| 2005/0257989 A1 | | 11/2005 | Iwami et al. | |
| 2005/0257990 A1 | | 11/2005 | Shimizu | |
| 2006/0169525 A1 | * | 8/2006 | Saito et al. | ..................... 180/444 |
| 2006/0180385 A1 | | 8/2006 | Yanai et al. | |
| 2008/0257630 A1 | | 10/2008 | Takeshima et al. | |

FOREIGN PATENT DOCUMENTS

JP 2002037117 A * 2/2002
JP 2004-231011 A 8/2004

* cited by examiner

*Primary Examiner* — Kevin Hurley
(74) *Attorney, Agent, or Firm* — Birch, Stewart, Kolasch & Birch, LLP

(57) ABSTRACT

A weight balance of a vehicle body is provided in an all terrain vehicle wherein an engine is supported by a vehicle body frame and an electric power steering device having an actuator unit is provided on a steering shaft. An electric motor is provided in the actuator unit, and heavy objects including a battery and a muffler are disposed on an opposite side to the electric motor in a vehicle width direction with respect to a vehicle body centerline extending in a longitudinal direction of the vehicle and on an opposite side to the electric motor in the longitudinal direction of the vehicle with respect to the engine. To shorten and reduce weight the steering shaft is supported on a vehicle body frame through a radial bearing and ball bearings. Of the plurality of bearings, at least one of the bearings is made self-aligning.

7 Claims, 9 Drawing Sheets

SADDLE RIDING VEHICLE

CROSS-REFERENCE TO RELATED APPLICATIONS

This application is a Divisional of application Ser. No. 11/392,715, filed on Mar. 30, 2006, now U.S. Pat. No. 7,665,570 which claims priority under 35 U.S.C.§119 to Japanese Patent Application Nos. 2005-101023 and 2005-100789 both filed on Mar. 31, 2005 the entire contents of which are hereby incorporated by reference.

FIELD OF THE INVENTION

The present invention relates to an improvement of a saddle riding vehicle and to an improvement of an electric power steering device support structure of a vehicle.

DESCRIPTION OF BACKGROUND ART

A conventional saddle riding vehicle is known wherein a drive motor 60 provided in an electric power steering device is disposed so as to extend from a steering shaft side toward an outside in a vehicle width direction. See, for example, Japanese Patent Laid-Open No. 2004-231011.

As shown in FIG. 3 of Japanese Patent Laid-Open No. 2004-231011, the drive motor 60 of the electric power steering device extends substantially toward a side of the vehicle from the steering shaft 50 side with the steering shaft 50 being present on a vehicle body centerline A extending in a longitudinal direction of a vehicle, and reaching above an upper front suspension arm member 25 supported by a vehicle body frame.

When the drive motor 60 is disposed so as to extend toward the side of the vehicle, a center of gravity of the drive motor 60 separates from the vehicle body centerline A toward the side of the vehicle. Moreover, a center of gravity position of the drive motor 60 substantially coincides with a position of the upper front suspension arm member 25 in the longitudinal direction of the vehicle, that is, a position of an axle of front wheels. Since the drive motor 60 is a heavy object, a center of gravity of the vehicle body also separates from the vehicle body centerline A toward the side of the vehicle. This affects a right and left balance of the vehicle body, and also affects a weight distribution to the front and rear wheels.

It is desirable that the center of gravity of the vehicle body be located on the vehicle body centerline, and it is desirable that the center of gravity of the heavy object such as the electric motor be located between the axle of the front wheels and an axle of the rear wheels.

In addition, Japanese Patent Laid-Open No. 2004-231011 discloses a conventional electric power steering device support structure of a vehicle wherein upper and lower portions of an electric power steering device are supported by bearings.

As shown in FIG. 4 of Japanese Patent Laid-Open No. 2004-231011, a steering shaft 50 includes an upper shaft 50a and a lower shaft 50b that are coupled to each other by a universal joint 51. The upper shaft 50a is freely rotatably attached through a shaft support member 52 to an upper bracket 53 bridged between right and left upper pipes 18. The lower shaft 50b is freely rotatably attached through a gear case 55 to a lower bracket 54 bridged between right and left front suspension support portions 23b of a front cross pipe 23.

The universal joint 51 is disposed between the shaft support member 52 and the gear case 55.

Since the universal joint 51 includes a pair of yokes, an overall length of the steering shaft 50 is lengthened. Moreover, in the case of assembling the electric power steering device and the steering shaft 50 to a vehicle body frame, first, the lower shaft 50b is temporarily attached to the lower bracket 54 together with the gear case 55, and next, an upper end of the universal joint 51 that is coupled to the lower shaft 50b is coupled to the upper shaft 50a. In this case, since an upper portion of the universal joint 51 bends, the upper shaft 50a must be coupled thereto while holding the upper portion of the universal joint 51. This arrangement is poor in assembling workability. Furthermore, the weight of the steering shaft 50 is increased by using the universal joint 51 as compared with use of a simple shaft.

SUMMARY AND OBJECTS OF THE INVENTION

It is an object of an embodiment of the present invention to maintain a weight balance of the vehicle body by improving the disposition of the electric power steering device of the vehicle.

An embodiment of the present invention provides a saddle riding vehicle, in which: an engine is supported by a vehicle body frame with a steering shaft being attached to the vehicle body frame so as to be freely rotatable. An electric power steering device includes a handle attached to an upper portion of the steering shaft and having an actuator unit provided on the steering shaft. An electric motor is provided in the actuator unit, and heavy objects including a battery and a muffler are disposed on an opposite side to the electric motor in a vehicle width direction with respect to a vehicle body centerline extending in a longitudinal direction of the vehicle and on an opposite side to the electric motor in the longitudinal direction of the vehicle with respect to the engine.

The heavy objects including the battery and the muffler are disposed on the opposite side to the electric motor in the vehicle width direction with respect to the vehicle body centerline and on the opposite side to the electric motor in the longitudinal direction of the vehicle with respect to the engine. The center of gravity of the vehicle body is thus located substantially on the centerline of the vehicle body and at a position of the engine.

An embodiment of the present invention provides the electric motor and the heavy objects including the battery and the muffler to be disposed at substantially equal distances from the vehicle body centerline.

The distance from the vehicle body centerline to the electric motor and the distance from the vehicle body centerline to the heavy objects including the battery and the muffler are substantially equalized to each other, and the center of gravity of the vehicle body is thus disposed substantially on the vehicle body centerline.

An embodiment of the present invention provides the engine to be disposed substantially at a center of the electric motor and the heavy objects including the battery and the muffler in the longitudinal direction of the vehicle.

The distance from the engine to the electric motor in the longitudinal direction of the vehicle and the distance from the engine to the heavy objects including the battery and the muffler are substantially equalized to each other, and the center of gravity of the vehicle body is thus located substantially at the position of the engine.

An embodiment of the present invention provides the electric motor to be disposed substantially in parallel to the vehicle body centerline.

By disposing the electric motor substantially parallel to the vehicle body centerline when viewed from above, it is possible to dispose the electric motor so that the electric motor does not protrude toward the side from the vehicle body frame extending in the longitudinal direction of the vehicle. In such a way, the electric motor is mounted within the vehicle body frame, thus protecting the electric motor. In addition, a weight balance is maintained between the electric motor and the heavy objects disposed on the opposite side to the electric motor in the vehicle width direction with respect to the vehicle body centerline.

In an embodiment of the present invention, the electric motor is provided in the actuator unit, and the heavy objects including the battery and the muffler are disposed on the opposite side to the electric motor in the vehicle width direction with respect to the vehicle body centerline extending in the longitudinal direction of the vehicle and on the opposite side to the electric motor in the longitudinal direction of the vehicle with respect to the engine. Accordingly, the center of gravity of the vehicle body can be located substantially on the vehicle body centerline and at the position of the engine disposed on a center portion of the vehicle body, and a longitudinal weight balance and right and left weight balance of the vehicle can be maintained.

In an embodiment of the present invention, the electric motor and the heavy objects including the battery and the muffler are disposed at the substantially equal distances from the vehicle body centerline. Accordingly, the center of gravity of the vehicle body can be located substantially on the vehicle body centerline, and a weight balance of the vehicle body in the vehicle width direction can be maintained.

In an embodiment of the present invention, the engine is disposed substantially at the center of the electric motor and the heavy objects including the battery and the muffler in the longitudinal direction of the vehicle. Accordingly, the center of gravity of the vehicle body can be located at the position of the engine disposed on the center portion of the vehicle body, and the weight balance of the vehicle body in the longitudinal direction can be maintained.

In an embodiment of the present invention, the electric motor is disposed so as to be substantially parallel to the vehicle body centerline when viewed from above. Accordingly, the electric motor is mounted within the vehicle body frame, thus attempting the protection of the electric motor, and the weight balance can be maintained between the electric motor and the heavy objects disposed on the opposite side to the electric motor in the vehicle width direction with respect to the vehicle body centerline.

It is an object of the present invention to shorten and reduce the weight of the steering shaft and to further enhance the assembling workability by improving the power steering device support structure of the vehicle.

An embodiment of the present invention provides an electric power steering device support structure of a vehicle with a steering shaft that is attached to a vehicle body frame so as to be freely rotatable. A handle is attached to an upper portion of the steering shaft, and an actuator unit is provided on the steering shaft wherein the steering shaft is supported on the vehicle body frame through plural bearings, and at least one of the bearings is made self-aligning.

When the steering shaft and the actuator unit are coupled to each other, a relative inclination between the mutual axes of the steering shaft and the actuator unit is absorbed by the self-aligning bearing. Accordingly, the assembling of the steering shaft and the actuator unit can be performed without stress, and a conventional universal joint is not necessary.

An embodiment of the present invention provides a pair among the bearings that is arranged above and below a vicinity of the actuator unit.

Spots located above and below the vicinity of the actuator unit are individually supported by the bearings, and the support of the actuator unit is thus ensured.

An embodiment of the present invention provides that the self-aligning bearing is disposed above the actuator unit.

When a shaft of the actuator unit is coupled to the steering shaft, and the steering shaft is supported by the self-aligning bearing, the self-aligning bearing absorbs an inclination of the steering shaft.

An embodiment of the present invention provides that the bearings are held by holders, and the holders are attached to the vehicle body frame side by bolts so as to be freely detachable therefrom.

An assembly of each bearing and each holder is attached to the vehicle body frame side by tightening of the bolts, or detached from the vehicle body frame side by loosening of the bolts, and accordingly, assembling workability thereof is enhanced.

An embodiment of the present invention provides that the steering shaft and the actuator unit are coupled to each other by serrations.

In the serrations, it is possible to finely set a pitch of gears thereof, and it is easy to adjust a phase of the coupling of the steering shaft side and the actuator unit side.

An embodiment of the present invention provides that the self-aligning bearing is disposed on a lower end of the steering shaft.

When the lower end of the steering shaft is supported by the self-aligning bearing, the self-aligning bearing absorbs the inclination of the steering shaft.

In an embodiment of the present invention, since the at least one of the bearings is made to be self-aligning, the inclination of the steering shaft at the time of assembling can be absorbed by the self-aligning bearing. Thus, the conventional universal joint becomes unnecessary. Further, cost of the electric power steering device can be reduced, and the assembling workability of the steering shaft and the actuator unit can be enhanced. Moreover, since the universal joint is unnecessary, the steering shaft can be shortened. Thus, a reduction of the weight of the steering shaft is achieved which makes it possible to reduce the cost.

In an embodiment of the present invention, since the pair among the bearings is arranged above and below the vicinity of the actuator unit, the actuator unit can be supported in a manner of being sandwiched by two spots located thereabove and therebelow, and the support of the actuator unit can be performed more surely by the bearings.

In an embodiment of the present invention, since the self-aligning bearing is disposed above the actuator unit, for example, in the case of coupling the spots located above and below the actuator unit to each other by the steering shaft and supporting the spots by the ball bearings, when the actuator unit is assembled to the bearing located thereabove after being assembled to the bearing located therebelow, the actuator unit can be assembled to the bearing without stress even if a shaft of the actuator unit and the steering shaft are inclined, thus making it possible to enhance the assembling workability.

In an embodiment of the present invention, since the ball bearing is held by the bearing holder, and the holder is attached to the vehicle body frame side by the bolts so as to be freely detachable therefrom, an assembly of the bearing and the holder can be attached to the vehicle body frame side, or can be detached from the vehicle body frame side, thus making it possible to enhance the assembling workability.

In an embodiment of the present invention, since the steering shaft and the actuator unit are coupled to each other by the serrations, a phase of the coupling of the steering shaft and the actuator unit can be finely adjusted by shortening the pitch of the gears of the serrations and increasing the number thereof.

In an embodiment of the present invention, since the self-aligning ball bearing is disposed on the lower end of the steering shaft, the inclination of the steering shaft can be absorbed by the self-aligning bearing. Thus, a high accuracy is not required for the vehicle body frame, and the assembling of the steering shaft can be performed easily.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
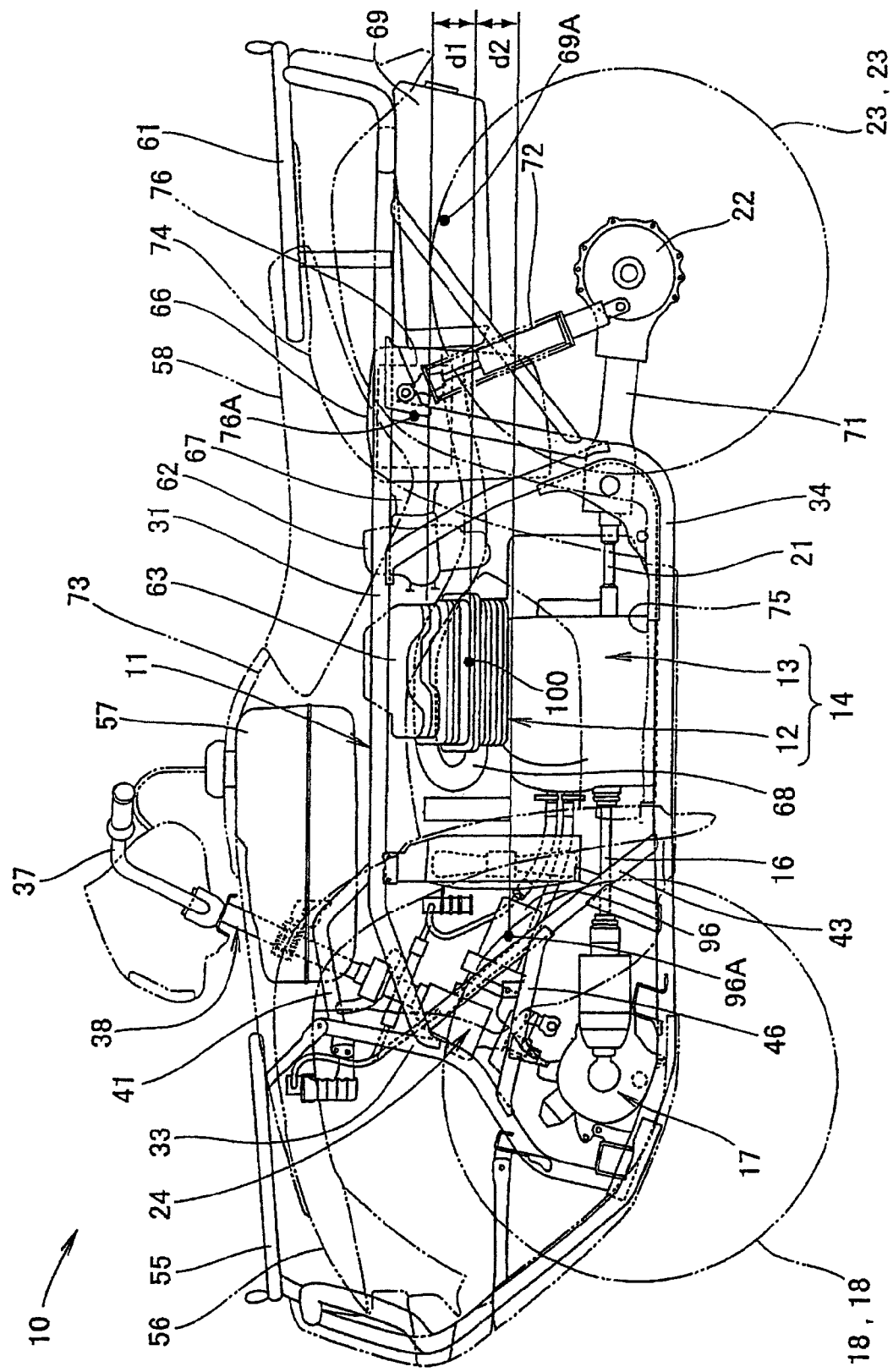
FIG. 1 is a side view of an all terrain vehicle including an electric power steering device according to the present invention.

A best mode for carrying out the present invention will be described below based on the accompanying drawings. FIG. 1 is a side view of an all terrain vehicle including an electric power steering device according to the present invention. An all terrain vehicle 10 is a four-wheel drive vehicle which mounts, on a center portion of a vehicle body frame 11, a power unit 14 composed of an engine 12 and a transmission 13. A front final reduction gear 17 is coupled to a front of the transmission 13 through a front propeller shaft 16. Right and left front wheels 18 and 18 are coupled to the front final reduction gear 17 through drive shafts (not shown). A rear final reduction gear 22 is coupled to a rear of the transmission 13 through a rear propeller shaft 21. Right and left rear wheels 23 and 23 are coupled to the rear final reduction gear 22 through drive shafts (not shown). An electric power steering device 24 is provided for reducing the steering effort to steer the front wheels 18 and 18.

The vehicle body frame 11 includes a right and left pair of upper main frames 31 and 32 (only the front-side reference numeral 31 is shown) that extend longitudinal. A front frame 33 has an inverted U-shape viewed from the front and is coupled individually to front ends of the upper main frames 31 and 32. A right and left pair of lower main frames 34 and 36 (only the front-side reference numeral 34 is shown) are individually coupled to lower ends of the front frame 33 and intermediate portions of the upper main frames 31 and 32. A right and left pair of angular front upper frames 41 and 42 (only the front-side reference numeral 41 is shown) are individually coupled to upper ends of the front frame 33 and the upper main frames 31 and 32 in order to freely rotatably support an upper portion of a steering shaft 38 having a handle 37 attached to an upper end thereof. A right and left pair of slant frames 43 and 44 (only the front-side reference numeral 43 is shown) are coupled from the front ends of the upper main frames 31 and 32 downwardly toward the rear to the lower main frames 34 and 36. A right and left pair of sub-slant frames 46 and 47 (only the front-side reference numeral 46 is shown) are provided which support a lower portion of the electric power steering device 24 by individually being bridged between the front frame 33 and intermediate portions of the slant frames 43 and 44 and coupling both thereof to each other.

A front carrier 55 is provided together with a front fender 56 which covers upper and rear portions of each front wheel 18. A fuel tank 57 is provided adjacent to a seat 58 with a rear carrier 61 being positioned behind the seat 58. A carburetor 62 is coupled to a rear side of a cylinder head 63 of the engine 12 with an air cleaner 66 coupled to the carburetor 62 through a connecting tube 67. An exhaust pipe 68 extends from a front of the cylinder head 63 toward the rear of the vehicle with a muffler 69 connected to a rear end of the exhaust pipe 68. A swing arm 71 is provided for supporting the rear wheels 23 and 23 so as to be freely swingable with respect to the lower main frames 34 and 36 side with a right and left pair of rear shock absorbers 72, 72 (only the front-side reference numeral 72 is shown) being bridged between the swing arm 71 and the upper main frames 31 and 32 side and being attached thereto. A body side cover 73 is disposed on a side of the power unit 14 with a rear fender 74 for covering front and upper portions of each rear wheel 23. A step floor 75 is provided. A a battery 76 is mounted relative to the vehicle.

The center of gravity 100 of the vehicle body (which is assumed here to be a portion obtained by removing the front wheels 18 and 18 and the rear wheels 23 and 23 from the all terrain vehicle 10) is provided with reference numeral 69A denoting a center of gravity of the muffler 69, reference numeral 76A denoting a center of gravity of the battery 76, and reference numeral 96A denoting a center of gravity of an electric motor 96 to be described later (refer to FIG. 2).

In the all terrain vehicle 10 as a saddle riding vehicle of this embodiment, when a distance between the center of gravity 100 and a vertical center of the center of gravity 76A and the center of gravity 69A is d1, and a vertical distance between the center of gravity 100 and the center of gravity 96A is d2, the distance d1 and the distance d2 are substantially equal to each other.

Figure 2:
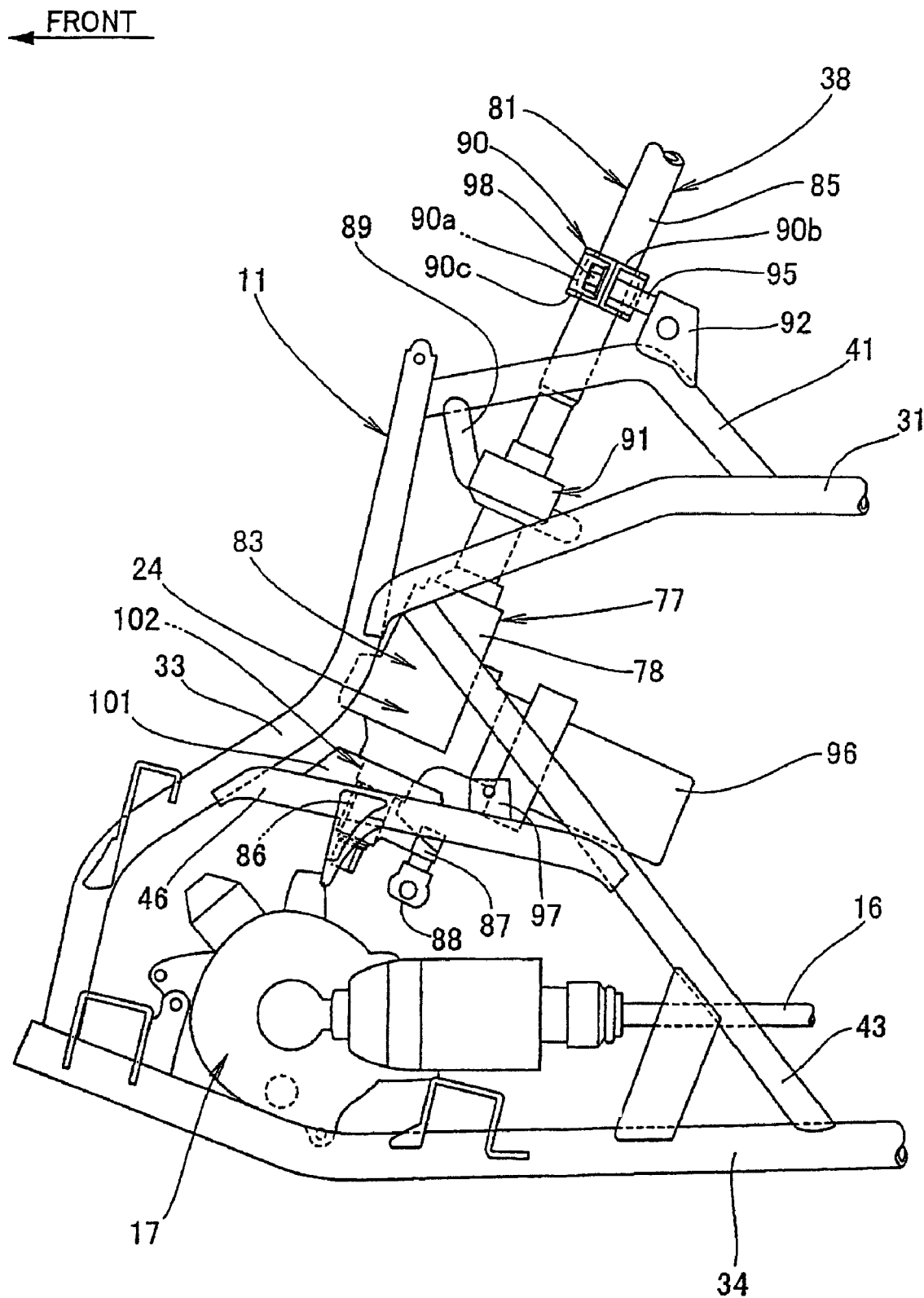
FIG. 2 is a main portion side view of the all terrain vehicle according to the present invention.

FIG. 2 is a main portion side view of the all terrain vehicle according to the present invention (an arrow (FRONT) in the drawing indicates the front of the vehicle, and the same is applied below). The electric power steering device 24 includes a steering device 81 for steering the front wheels with an actuator unit 77 provided on the steering shaft 38 for constructing the steering device 81 and a control unit (not shown). The actuator unit 77 is one in which a torque sensor unit (not shown) which detects steering torque, and a power assist unit 83 which generates power assisting the steering effort, are provided in an actuator case 78. The control unit controls the power assist unit 83 based on the steering torque detected by the torque sensor unit, and the like.

The steering device 81 includes the handle 37 (refer to FIG. 1), an input shaft 85 for supporting the handle 37, an output shaft 86 coupled to the input shaft 85 through the torque sensor unit, a steering arm 87 attached to a lower end of the output shaft 86, a right and left pair of ball joints 88 and 88 (only the front-side reference numeral 88 is shown) attached to the steering arm 87, and a right and left pair of tie rods (not shown), each having one end thereof coupled to each of the ball joints 88 and 88 and having the other end coupled to each knuckle (not shown) on the front wheel 18 (refer to FIG. 1) side. The above-described input shaft 85 and output shaft 86 are members constructing the steering shaft 38.

The input shaft 85 is a member supported by two spots thereof. One of the spots is supported by an upper bearing portion 90, and the other is supported by an intermediate bearing portion 91 located below the upper bearing portion 90.

The upper bearing portion 90 is attached to a support bracket 92 that is bridged between the right and left front upper frames 41 and 42 (only the front-side reference numeral 41 is shown) through two collars 95 and 95 by bolts 98 and 98. The upper bearing portion 90 includes a radial bearing (slide bearing) 90a for supporting the input shaft 85 so as to be freely rotatable, and a pair of bearing holding members 90b and 90c which sandwich and hold the radial bearing 90a.

The intermediate bearing portion 91 is one supported by an intermediate bearing support bracket (not shown, and details thereof will be described later) attached to sub-upper frames 89 and 89 (only the front-side reference numeral 89 is shown).

The sub-upper frames 89 and 89 are members bridged individually between the front upper frames 41 and 42 and the upper main frames 31 and 32 (only the front-side reference numeral 31 is shown).

The output shaft 86 is one supported on the right and left sub-slant frames 46 and 47 (only the front-side reference numeral 46 is shown) through a lower bearing support bracket 101 by a lower bearing portion 102.

The torque sensor unit is one in which a torsion bar (not shown) is provided between the input shaft 85 side and the output shaft 86 side.

When the input shaft 85 is rotated by an operation of the handle 37 (refer to FIG. 1), an angular strain occurs between the input shaft 85 and the output shaft 86, and the torsion bar is twisted. An amount of the twist is converted into torque, and the steering torque is thus obtained.

The power assist unit 83 is a portion composed of the electric motor 96, a clutch (not shown) interposed between an output shaft of the electric motor 96 and the output shaft 86, and a speed reducer (not shown, and composed of a worm gear and a worm wheel).

The electric motor 96 is one in which a front end side (output shaft 86 side) thereof is attached to motor brackets 97 and 97 (only the front-side reference numeral 97 is shown) provided on the sub-slant frames 46 and 47.

The control unit controls the power assist unit 83 based on the steering torque detected by the torque sensor unit, a steering angle detected by a steering angle sensor, a vehicle speed of the all terrain vehicle 10 (refer to FIG. 1), and the like.

The front final reduction gear 17 is located below the actuator unit 77, and accordingly, in the present invention, an overall length of the steering shaft 38 in the electric power steering device 24 is shortened, and the electric power steering device 24 is disposed in a small space.

Figure 3:
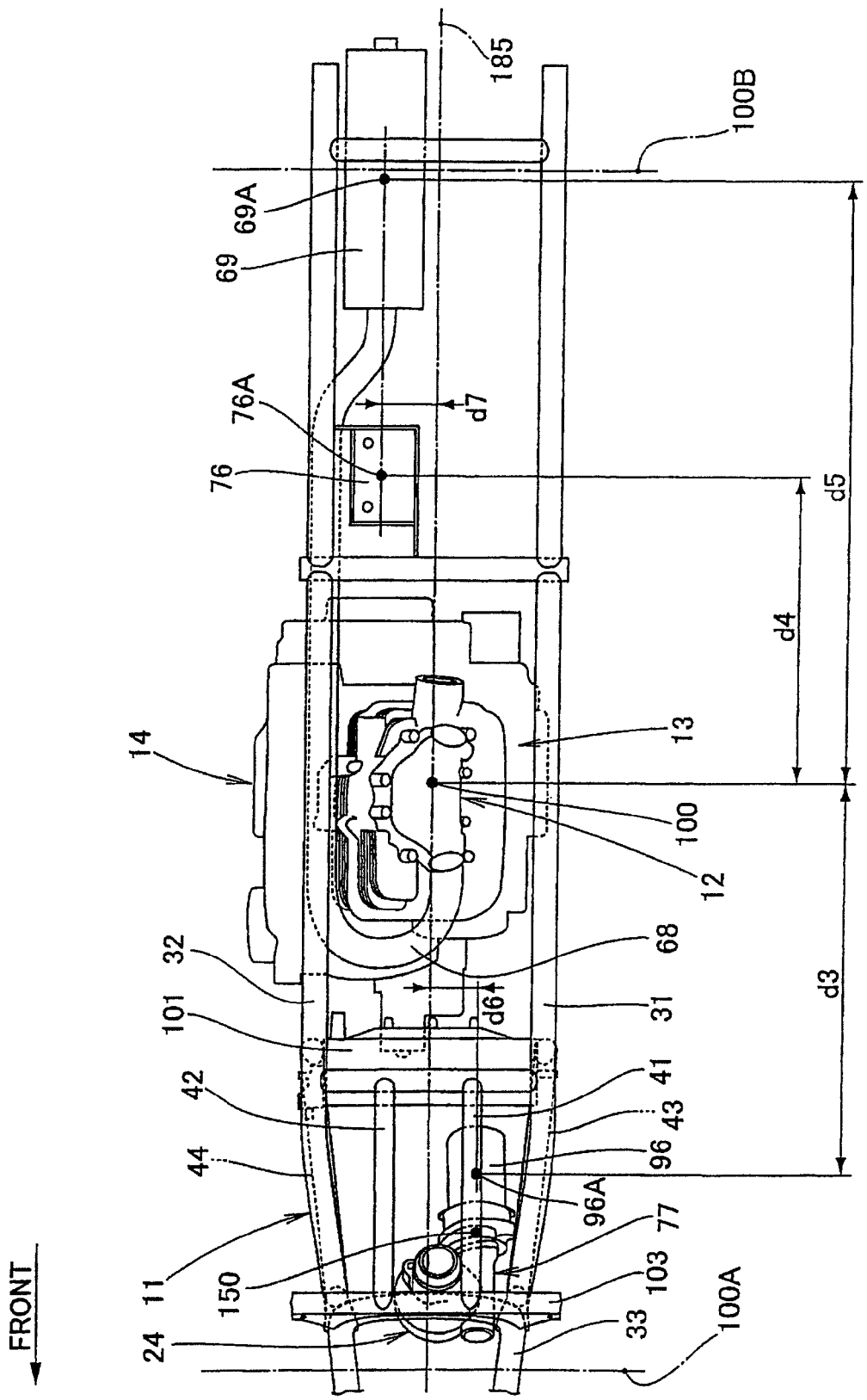
FIG. 3 is a main portion plan view of the all terrain vehicle according to the present invention.

FIG. 3 is a main portion plan view of the all terrain vehicle according to the present invention. The electric motor 96 is disposed so as to extend toward the rear of the vehicle, that is, the electric motor 96 is disposed substantially parallel to a vehicle body centerline 185 viewed from above. Moreover, an air cooling fan 101 is disposed rearwardly of the electric motor 96, and disposed in front of the engine 12 and the exhaust pipe 68. An axial line 100A of an axle of the right and left front wheels 18 and 18 (refer to FIG. 1) is provided together with an axial line 100B of an axle of the right and left rear wheels 23 and 23 (refer to FIG. 1). A cross member 103 is attached to an upper portion of the front frame 33 so as to extend in a vehicle width direction in order to support respective upper ends of right and left front shock absorbers for the front wheels 18 and 18.

The center of gravity 100 of the vehicle body is located on the vehicle body centerline 185 extending substantially in the longitudinal direction of the vehicle body.

On a left side of the vehicle body centerline 185, the electric motor 96 of the actuator unit 77 is located. On a right side from the vehicle body centerline 185, the battery 76 and the muffler 69 are located. Moreover, the respective centers of gravity 96A, 76A, and 69A of the electric motor 96, the battery 76, and the muffler 69 are located between the axial line 100A of the axle of the front wheels 18 and 18 and the axial line 100B of the axle of the rear wheels 23 and 23.

When a distance between the center of gravity 100 and the center of gravity 96A in the longitudinal direction of the vehicle is d3, a distance between the center of gravity 100 and the center of gravity 76A in the longitudinal direction of the vehicle is d4, and a distance between the center of gravity 100 and the center of gravity 69A in the longitudinal direction of the vehicle is d5, a distance to the center of gravity 100 from a center of the center of gravity 76A and the center of gravity 69A in the longitudinal direction of the vehicle is substantially equal to the distance d3.

When a distance from the vehicle body centerline 185 to the center of gravity 96A is d6, and a distance from the vehicle body centerline 185 to the center of gravity 76A (or the center of gravity 69A) is d7, the distance d6 and the distance d7 are substantially equal to each other.

The electric motor 96 is completely shielded from the engine 12 and the exhaust pipe 68 by the air cooling fan 101. Accordingly, even if the electric motor 96 is disposed so as to extend toward the rear of the vehicle, and a distance from the electric motor 96 to the engine 12 and the exhaust pipe 68 is thus reduced, there is no concern that direct radiant heat from the engine 12 and the exhaust pipe 68 may strike the electric motor 96.

Figure 4:
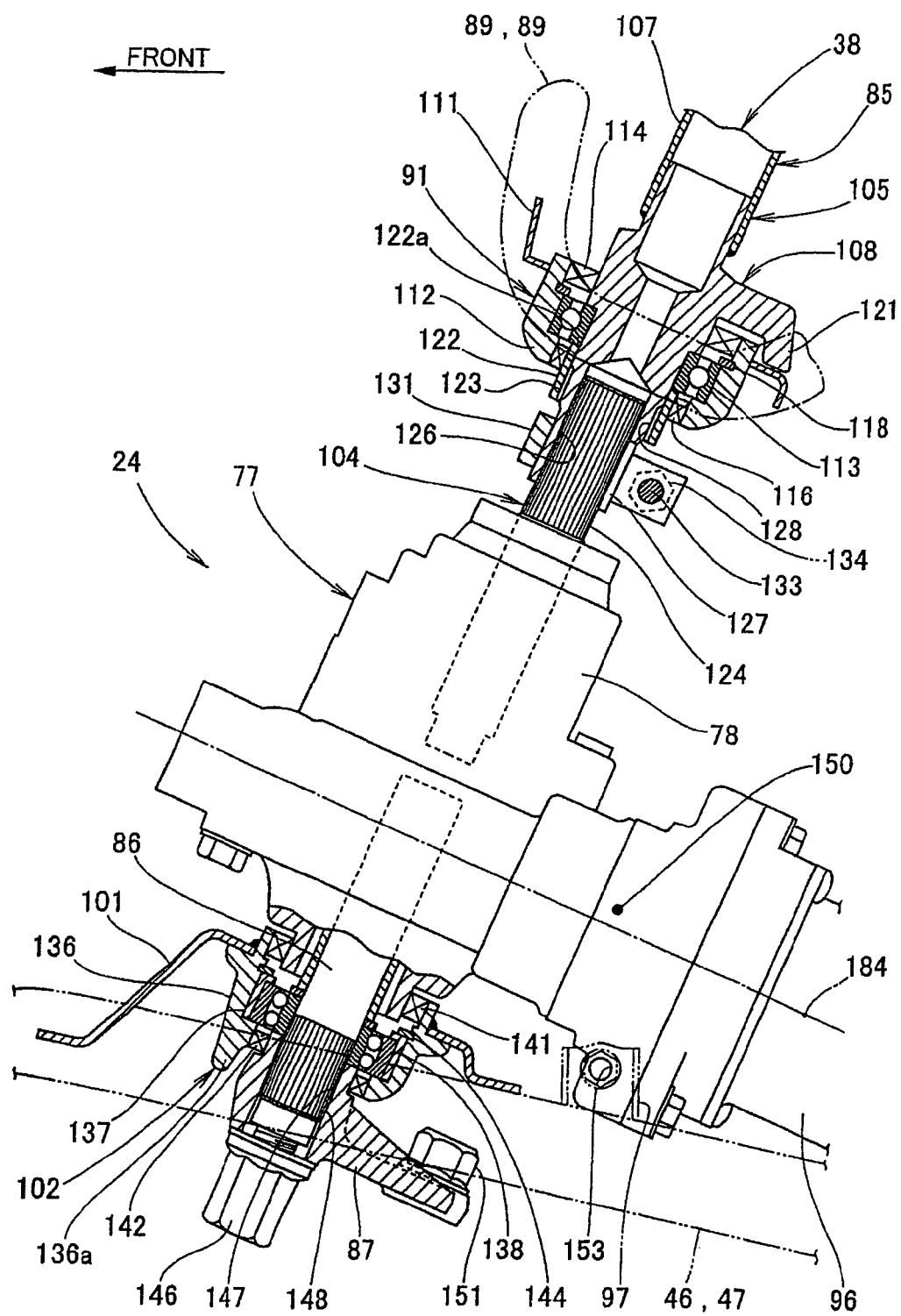
FIG. 4 is a cross-sectional view showing a support structure of the electric power steering device according to the present invention.

FIG. 4 is a cross-sectional view (partially side view) showing a support structure of the electric power steering device according to the present invention. The input shaft 85 is composed of a lower shaft 104 projecting from the actuator 77, and an upper shaft 105 supported by the intermediate bearing portion 91 and coupled to the lower shaft 104. The upper shaft 105 is composed of an upper pipe 107 which supports the handle, and a lower end coupling member 108 attached to a lower end of the upper pipe 107.

The intermediate bearing portion 91 is composed of an upper bearing holder 112 attached to an intermediate bearing support bracket 111 by a bolt (not shown) so as to be freely detachable therefrom. A ball bearing 113 is attached to the upper bearing holder 112 in order to support the lower end coupling member 108 so as to be freely rotatable. Seal members 114 and 116 are provided for protecting the ball bearing 113 from dust and the like. A snap ring 118 is provided for preventing the ball bearing 113 from falling off from the upper bearing holder 112.

The lower end coupling member 108 is a member, in which a rearwardly projecting portion 121 projects toward the rear of the vehicle and is integrally provided in an upper portion. In a lower portion, there are provided a male screw 123 for screwing and coupling the lower end coupling member 108 into a nut member 122, a female serration 126 coupled to a male serration 124 provided on an outer circumferential surface of the lower shaft 104, and a slit 127 provided on a tip end thereof.

The rearward projecting portion 121 is a portion which abuts on a stopper (not shown) provided on the upper bearing holder 112 when the lower end coupling member 108 is rotated through the handle, and is one which regulates the steering angle of the handle within a predetermined angle range.

The nut member 122 is one in which a tip end 122a is pressed against the ball bearing 113 by screwing a female screw 128 thereof onto the male screw 123.

The slit 127 is a portion adapted so that clamping force of a clamping member 131 can be effectively applied to an outer circumferential surface of the lower end coupling member 108 by narrowing a width of the slit 127 when the outer circumferential surface of the lower end coupling member 108 is clamped by the clamping member 131 in a state where the lower shaft 104 and the lower end coupling member 108 are coupled to each other by the serrations. A clamping bolt 133 and nut 134 are provided in the clamping member 131.

The lower bearing portion 102 includes a lower bearing holder 136 attached to a center portion of the lower bearing support bracket 101 supported by the sub-slant frames 46 and 47, a self-aligning ball bearing 138 attached to the lower bearing holder 136 through a collar 137 in order to support the output shaft 86 so as to be freely rotatable, and seal members 141 and 142 for protecting the ball bearing 138 from the dust and the like. A snap ring 144 is provided for preventing the ball bearing 138 and the collar 137 from falling off from the lower bearing holder 136.

The lower bearing holder 136 is a downward projecting portion 136a that projects downwardly and substantially along the output shaft 86 and is formed in a front portion. When the handle is turned to rotate the output shaft 86 by a predetermined angle, a sideward projecting portion (not shown) provided on the steering arm 87 abuts on the downwardly projecting portion 136a, and a rotation angle range of the output shaft 86 is thus regulated. More specifically, the downward projecting portion 136a serves as a stopper for regulating the rotation angle range of the output shaft 86.

The steering arm 87 is a member attached to the end portion of the output shaft 86 with a nut 146. A female serration 147 formed on an inner circumferential surface of the steering arm 87 is coupled to a male serration 148 formed on the lower end of the output shaft 86. A ball joint (not shown) is attached to a nut portion 151 provided integrally with the steering arm 87. Then, the ball joint is coupled to the front wheel side by tie rods (not shown). Female screws 153 are provided for screwing screws (not shown) when the electric motor is attached to the motor brackets 97 by the screws.

A black circle shown in the drawing represents a center of gravity 150 of the actuator unit 77. The center of gravity 150 is located above the motor brackets 97 and in the vicinity of the motor brackets 97. More specifically, the motor brackets 97 and 97 are disposed in the vicinity of the center of gravity 150 of the actuator unit 77, thus making it possible to efficiently support the weight of the actuator unit 77 by the motor brackets 97 and 97, and to reduce a load of supporting the actuator unit 77 by the intermediate bearing portion 91 and the lower bearing portion 102.

Figure 5:
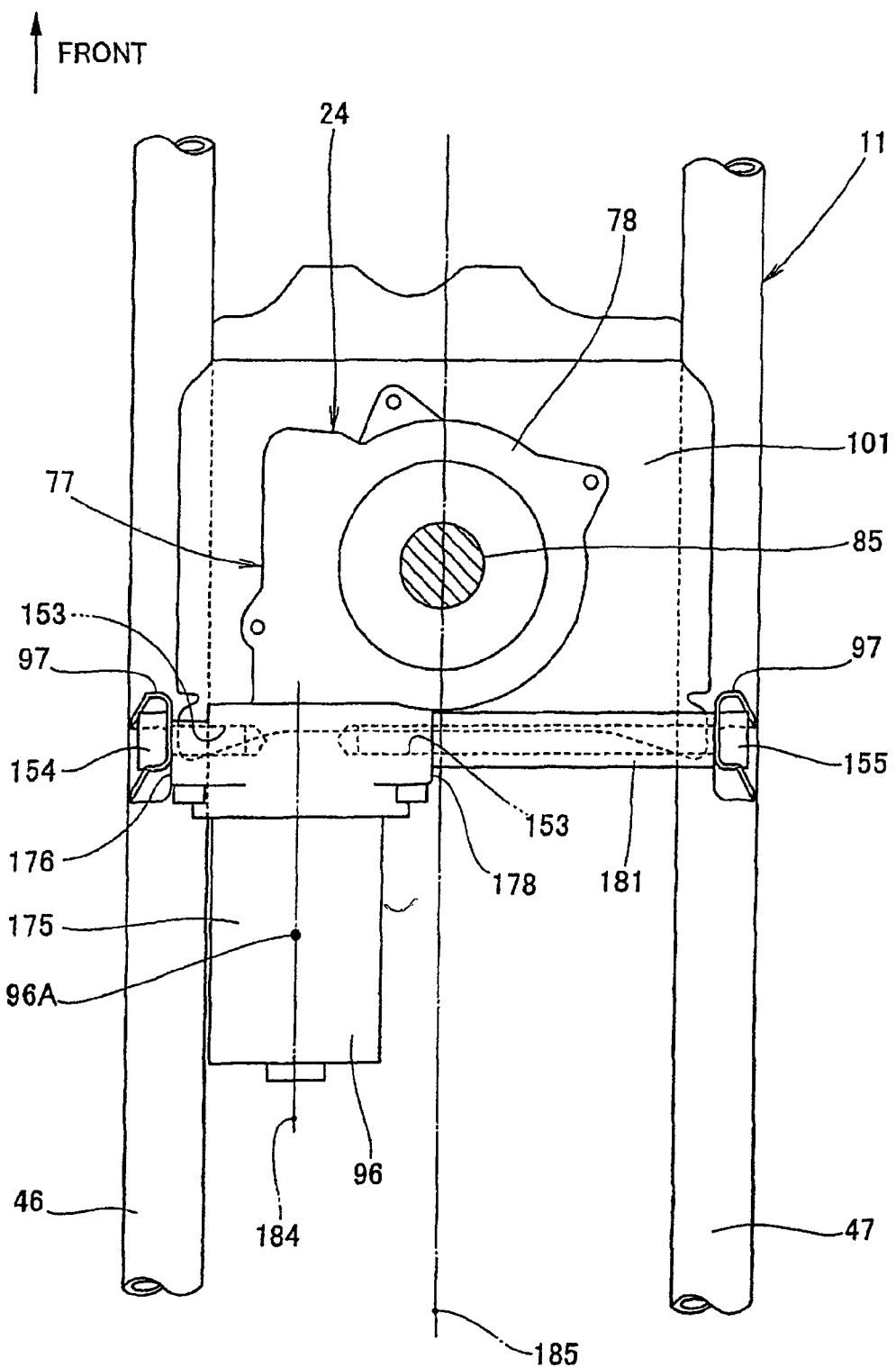
FIG. 5 is an explanatory view showing the support structure of the electric power steering device according to the present invention.

FIG. 5 is an explanatory view showing a support structure of the electric power steering device according to the present invention as viewed from an axial line direction of the input shaft 85.

The actuator unit 77 of the electric power steering device 24 is one, in which the female screws 153 are individually drilled in both side surfaces 176 and 178 of a case 175 of the electric motor 96, and bolts 154 and 155 are screwed into the female screws 153 and 153 and attached thereto, respectively, after being drawn through bolt insertion holes (not shown) drilled in the right and left motor brackets 97 and 97. A cylindrical collar member 181 is interposed between the right-side motor bracket 97 and the case 175 and covered on the bolt 155.

As shown in FIG. 4, with regard to the actuator unit 77, upper and lower portions thereof are supported so as to be freely rotatable by the intermediate bearing portion 91 and the lower bearing portion 102, respectively. Accordingly, in FIG. 5, in a state where the electric motor 96 is not attached to the vehicle body frame 11 side, the actuator unit 77 is in a state capable of freely swinging around the steering shaft 38. Hence, the actuator unit 77 is attached to the vehicle body frame 11 side so as to stop such swing of the actuator 77 by the motor brackets 97 and 97 having surfaces substantially perpendicular to a direction of the swing, whereby the actuator unit 77 can be supported without laboring. Moreover, the bolts 154 and 155 extend substantially in a tangential direction of the swinging direction of the actuator 77, and accordingly, rotational force generated when the actuator unit 77 is applied as tensile force or compression force to the bolts 154 and 155. Therefore, the tensile force or the compression force can be received by the bolts 154 and 155 without trouble.

The electric motor 96 extends from the actuator case 78 toward the rear of the vehicle. An axial line 184 of a rotation shaft of the electric motor 96 is parallel to the vehicle body centerline 185 extending in the longitudinal direction of the vehicle, and the center of gravity 96A of the electric motor 96 is on the axial line 185. Since the electric motor 96 is a heavy object, when the center of gravity 96A of the electric motor 96 separates from the vehicle body centerline 185, the center of gravity of the vehicle body moves over to the left side of the vehicle body. However, on the right side from the vehicle body centerline 185 of the vehicle body, heavy objects which weight is substantially equivalent to that of the electric motor 96, that is, the battery 76 and the muffler 69, are mounted as shown in FIG. 3. Accordingly, it is made possible to dispose the center of gravity 100 of the vehicle body substantially on the vehicle body centerline 185.

As described above based on FIG. 2 and FIG. 3, an embodiment of the present invention provides an all terrain vehicle 10 (refer to FIG. 1), as a saddle riding vehicle, in which the engine 12 is supported by the vehicle body frame 11 with the steering shaft 38 being attached to the vehicle body frame 11 so as to be freely rotatable. The electric power steering device 24 is provided with the handle 37 (refer to FIG. 1) attached to the upper portion of the steering shaft 38 and having the actuator unit 77 provided on the steering shaft 38. The electric motor 96 is provided in the actuator unit 77. The heavy objects including the battery 76 and the muffler 69 are disposed on the opposite side to the electric motor 96 in the vehicle width direction with respect to the vehicle body centerline 185 extending in the longitudinal direction of the vehicle and on the opposite side to the electric motor 96 in the longitudinal direction of the vehicle with respect to the engine 12.

The electric motor 96 is provided in the actuator unit 77, and the heavy objects including the battery 76 and the muffler 69 are disposed on the opposite side to the electric motor 96 in the vehicle width direction with respect to the vehicle body centerline 185 extending in the longitudinal direction of the vehicle and on the opposite side to the electric motor 96 in the longitudinal direction of the vehicle with respect to the engine 12. Accordingly, the center of gravity 100 of the vehicle body can be located substantially on the vehicle body centerline 185 and at the position of the engine 12 disposed on the center portion of the vehicle body. Thus, maintenance of the longitudinal weight balance and right and left weight balance of the vehicle body can be attempted.

An embodiment of the present invention permits the electric motor 96 and the heavy objects including the battery 76 and the muffler 69 to be disposed at substantially equal distances from the vehicle body centerline 185.

The electric motor 96 and the heavy objects including the battery 76 and the muffler 69 are disposed at substantially equal distances from the vehicle body centerline 185. Accordingly, the center of gravity 100 of the vehicle body can be located substantially on the vehicle body centerline 185, and the weight balance of the vehicle body in the vehicle width direction can be maintained.

An embodiment of the present invention provides the engine 12 to be disposed substantially at the center of the electric motor 96 with heavy objects including the battery 76 and the muffler 69 in the longitudinal direction of the vehicle.

The engine 12 is disposed substantially at the center of the electric motor 96 and the heavy objects including the battery 76 and the muffler 69 in the longitudinal direction of the vehicle. Accordingly, the center of gravity 100 of the vehicle body can be located at the position of the engine 12 disposed on the center portion of the vehicle body, and the weight balance of the vehicle body in the longitudinal direction can be maintained.

As shown in FIG. 3 and FIG. 5, the present invention includes the electric motor 96 to be disposed substantially parallel to the vehicle body centerline 185 when viewed from above.

The electric motor 96 is disposed so as to be substantially parallel to the vehicle body centerline 185 when viewed from above. Accordingly, the electric motor 96 is mounted within the vehicle body frame 11, thus protecting of the electric motor 96, and the weight balance can be maintained between the electric motor 96 and the heavy objects including the battery 76 and the muffler 69, which are disposed on the opposite side to the electric motor 96 in the vehicle width direction with respect to the vehicle body centerline 185.

Note that, in this embodiment, as shown in FIG. 3, the battery 76 and the muffler 69 which are the heavy objects are disposed on the opposite side to the electric motor 96 with respect to the vehicle body centerline 185. However, the heavy objects are not limited to these, and for example, they may be a spare tire and tools.

The electric power steering device of the present invention is suitable for a four wheeler such as the all terrain vehicle.

Figure 6:
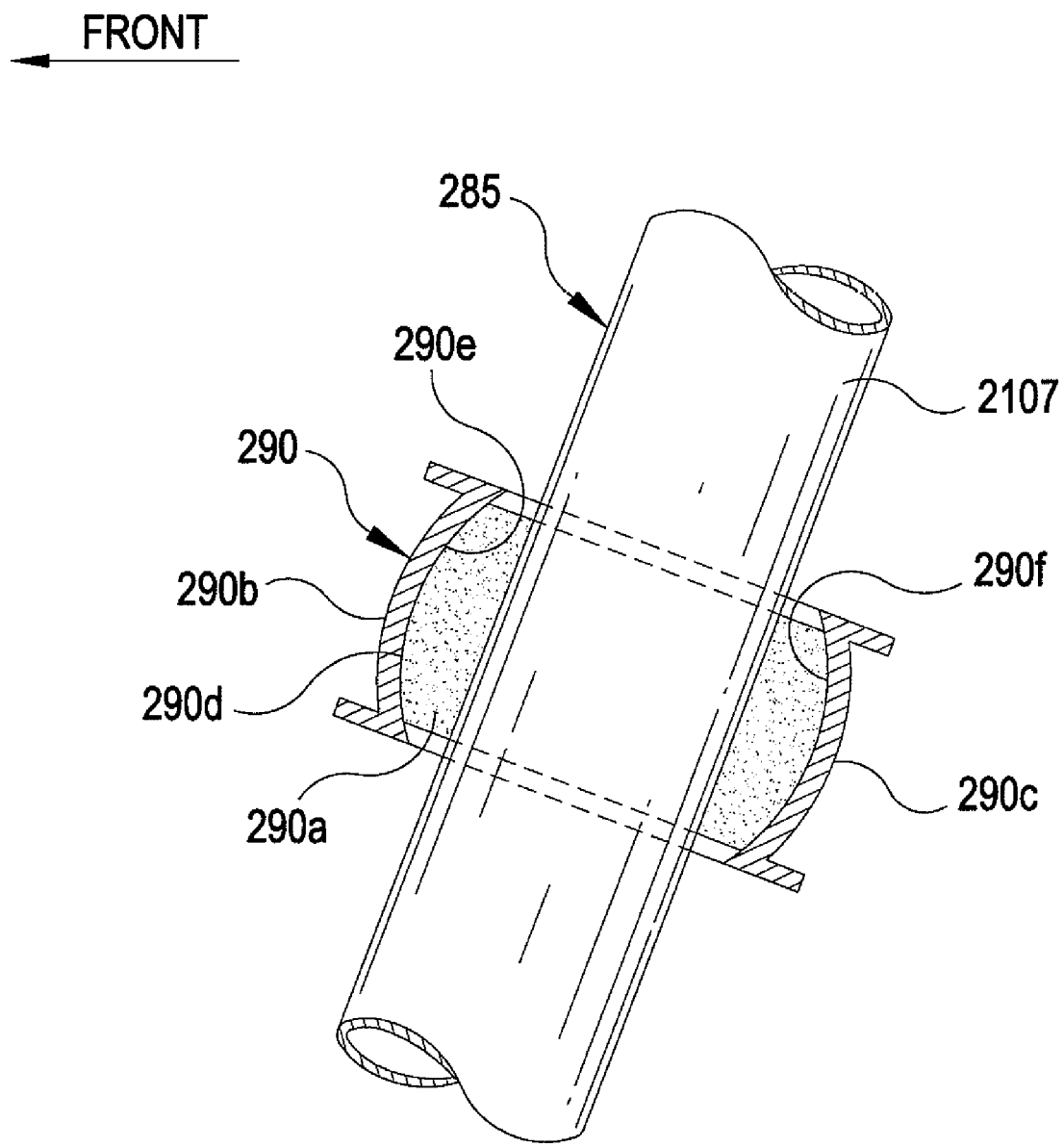
FIG. 6 is a cross-sectional view of an upper bearing portion which supports a steering shaft according to the present invention.

FIG. 6 is a cross-sectional view of the upper bearing portion which supports the steering shaft according to the present invention. The upper bearing portion 290 includes the radial bearing 290a fitted to the input shaft 285, and the bearing holding members 290b and 290c. The radial bearing 290a is a member in which an outer circumferential surface 290d is formed into a convex spherical shape, and is one in which respective inner circumferential surfaces 290e and 290f of the bearing holding members 290b and 290c, which are formed into a concave spherical shape, are fitted to the outer circumferential surface 290d so as to be freely slidable. As described above, the upper bearing portion 290 is a self-aligning one capable of absorbing an inclination of the input shaft 286 even if the input shaft 285 is attached thereto while being inclined with respect to a predetermined attached state.

As described above, by using the self-aligning radial bearing 290a, it is made possible to assemble the steering shaft to the upper bearing portion 290 without requiring high dimensional accuracy for the vehicle body frame 211.

Figure 7:
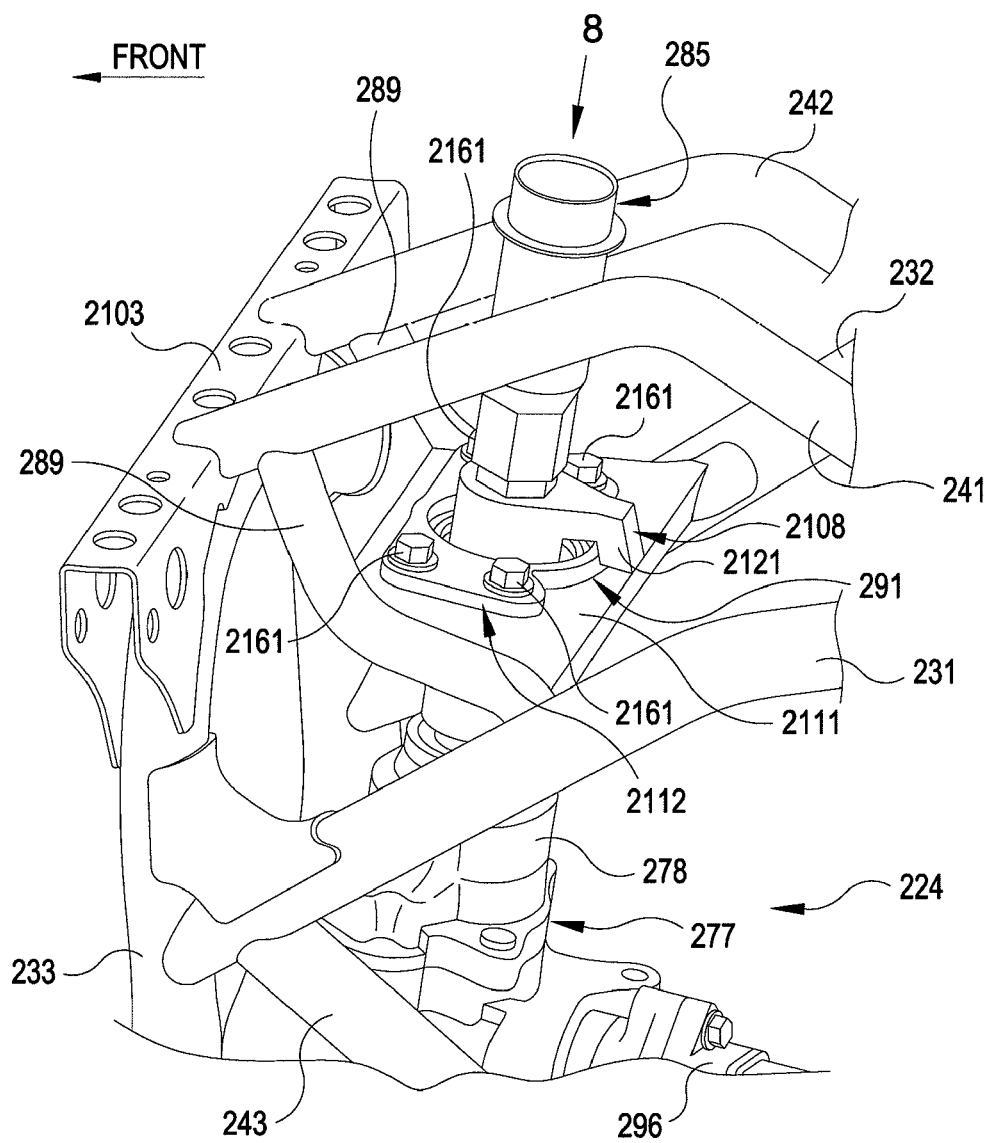
FIG. 7 is a perspective view showing an intermediate bearing portion of the steering shaft according to the present invention.

FIG. 7 is a perspective view showing the intermediate bearing portion of the steering shaft according to the present invention. FIG. 7 shows that the intermediate bearing support bracket 2111 is attached to the right and left sub upper frames 289 and 289, and that the upper bearing holder 2112 of the intermediate bearing portion 291 is attached to the intermediate bearing support bracket 2111 by a plurality of bolts 2161.

The upper bearing holder 2112 is one which houses the ball bearing 2113. Accordingly, an assembly of the ball bearing 2113 and the upper bearing holder 2112 can be easily attached to the intermediate bearing support bracket 2111, or can be easily detached from the intermediate bearing support bracket 2111, thus making it possible to enhance assembling workability.

Figure 8:
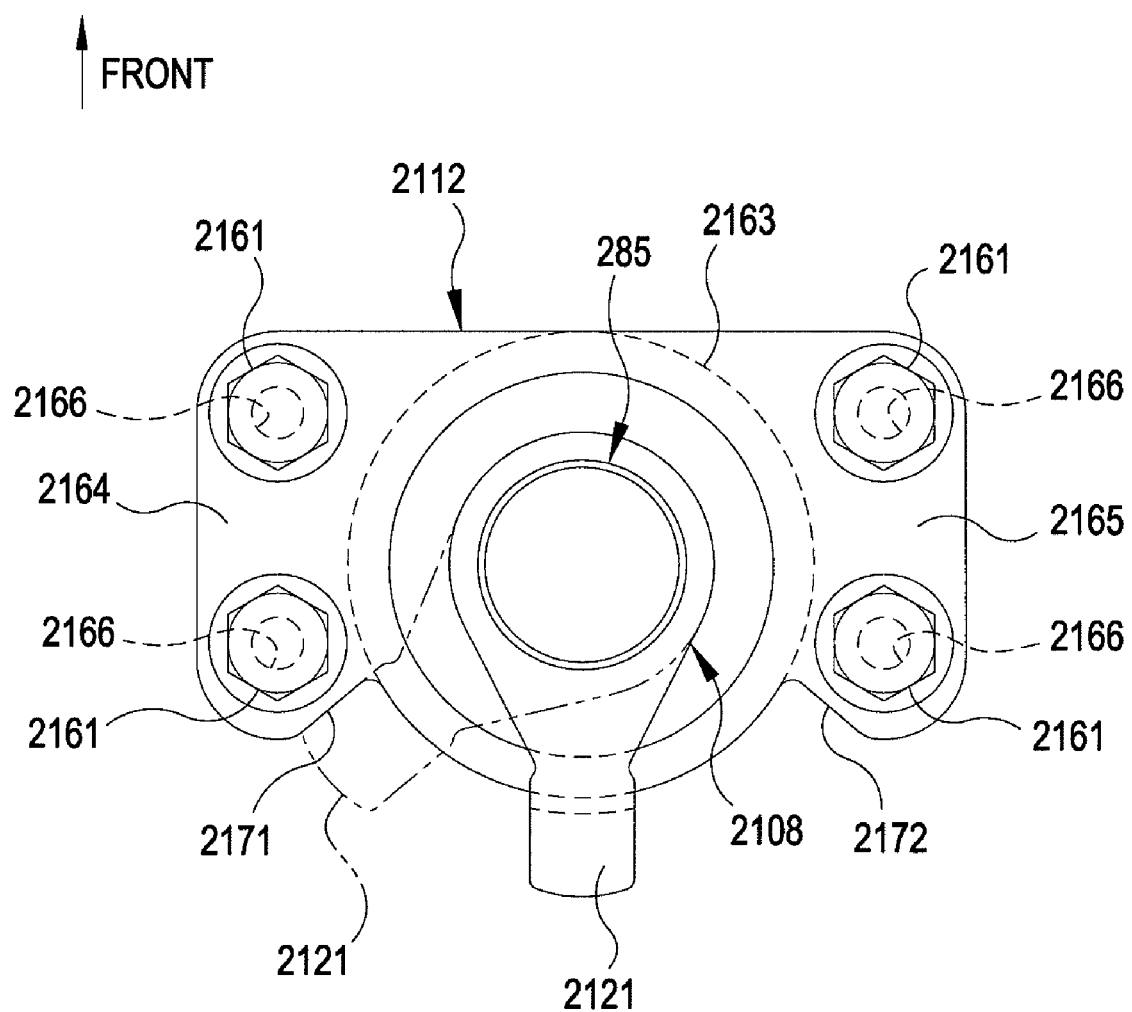
FIG. 8 is a view on arrow 8 of FIG. 7.

FIG. 8 is a view on arrow 8 of FIG. 7, showing the lower end coupling member 2108 and the upper bearing holder 2112.

The upper bearing holder 2112 includes a cylinder portion 2163 provided in a center portion thereof, and plate portions 2164 and 2165 extending from the cylinder portion 2163 toward both sides thereof integrally. A plurality of attachment holes 2166 are drilled in the plate portions 2164 and 2165, and the bolts 2161 are inserted through the respective attachment holes 2166, and are screwed into nuts (not shown) provided on a lower surface of the intermediate bearing support bracket 2111 (refer to FIG. 7). Thus, the upper bearing holder 2112 is attached to the intermediate bearing support bracket 2111. Note that reference numerals 2171 and 2172 denote stoppers, which regulate a rotation angle range of the input shaft 285 in such a manner that the rearward projecting portion 2121 of the lower end coupling member 2108 is made to abut on the stoppers 2171 and 2172 concerned.

Figure 9:
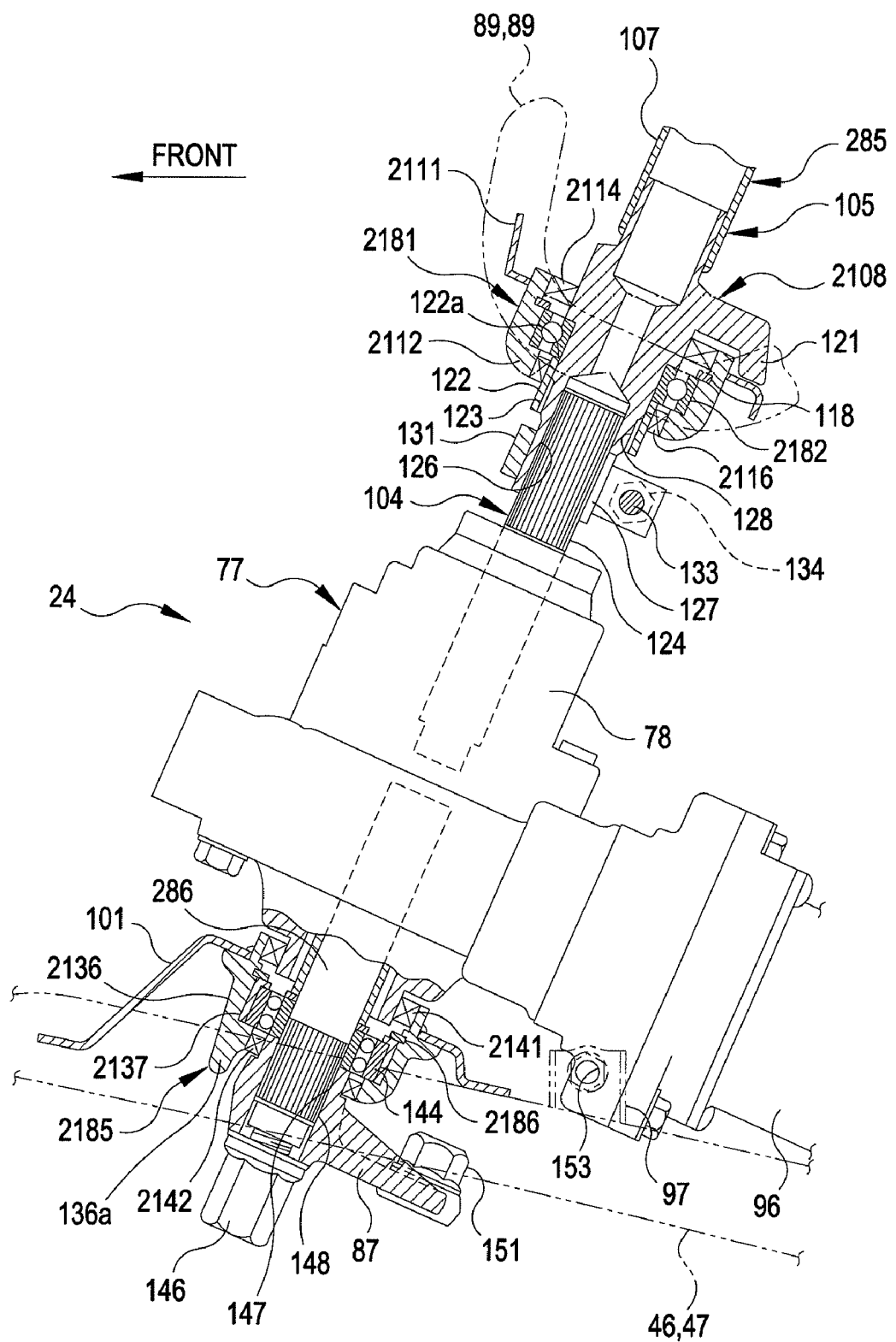
FIG. 9 is a cross-sectional view showing another embodiment of the electric power steering device support structure according to the present invention.

FIG. 9 is a cross-sectional view (partial side view) showing another embodiment of the electric power steering device support structure according to the present invention.

The intermediate bearing portion 2181 which supports the input shaft 285 includes the upper bearing holder 2112, an upper bearing holder 2182 attached to the upper bearing holder 2112 in order to support the lower end coupling member 2108 so as to be freely rotatable, and the seal members 2114 and 2116 for protecting the ball bearing 2182 from dust and the like.

A lower bearing portion 2185, which supports the output shaft 286, includes the lower bearing holder 2136, a self-aligning ball bearing 2186 attached to the lower bearing holder 2136 through the collar 2137 in order to support the output shaft 286 so as to be freely rotatable, and the seal members 2141 and 2142 for protecting the ball bearing 2186 from the dust and the like.

The ball bearing 2186 which supports the lower end of the steering shaft is made self-aligning, thus making it possible to assemble the steering shaft to the ball bearing 2186 without trouble even if the dimensional accuracy of the vehicle body frame, and more specifically, of the sub-slant frames 246 and 247 is low. Moreover, the output shaft 286 can be inclined from a normal position thereof by the self-aligning ball bearing 2186 during the assembling of the steering shaft 238, thus also making it possible to prevent the output shaft 286 from disturbing the assembling of other members. Thus, assembling workability can be enhanced.

As described above based on FIG. 1 and FIG. 4, an embodiment of the present invention provides an all terrain vehicle 10 including the electric power steering device 24 in which the steering shaft 38 is attached to the vehicle body frame 11 so as to be freely rotatable with the handle 37 being attached to the upper portion of the steering shaft 38, and the actuator unit 77 being provided on the steering shaft 38, in that the steering shaft 38 is supported on the vehicle body frame 11 through the radial bearing 90a (refer to FIG. 2) and the ball bearings 113 and 118, which are a plurality of bearings. At least one of the bearings 90a, 113 and 138, that is, the ball bearing 113 is made self-aligning.

Since the at least one of the bearings 90a, 113 and 138 is made self-aligning, the inclination of the steering shaft 38 at the time of assembling can be absorbed by the self-aligning bearing 113, and the conventional universal joint becomes unnecessary. Thus, the cost of the electric power steering device can be reduced, and the assembling workability of the steering shaft 38 and the actuator unit 77 can be enhanced. Moreover, since the conventional universal joint is eliminated, the steering shaft 38 can be shortened, and the weight of the steering shaft 38 can be reduced.

An embodiment of the present invention provides a pair among the bearings that is arranged above and below a vicinity of the actuator unit 77.

Since the pair of bearings 113 and 138 among the bearings 90a, 113 and 138 is arranged above and below the vicinity of the actuator unit 77, the actuator unit 77 can be supported in a manner of being sandwiched by two spots located thereabove and therebelow, and the support of the actuator unit 77 can be performed more surely by the bearings 113 and 138.

An embodiment of the present invention provides the self-aligning bearing 113 to be disposed above the actuator unit 77.

Since the self-aligning bearing 113 is disposed above the actuator unit 77, for example, in the case of coupling the spots located above and below the actuator unit 77 to each other by the steering shaft 38 and supporting the spots by the ball bearings 113 and 138, when the actuator unit 77 is assembled to the bearing 113 located thereabove after being assembled to the bearing 138 located therebelow, the actuator unit 77 can be assembled to the bearing 113 without stress even if the lower shaft 104 as a shaft of the actuator unit 77 and the lower end coupling member 108 of the steering shaft 38 are inclined, thus making it possible to enhance the assembling workability.

An embodiment of the present invention provides, as shown in FIG. 7, the ball bearing 2113 that is held by the upper bearing holder 2112, and the upper bearing holder 2112 that is attached to the vehicle body frame 211 side, that is, to the intermediate bearing support bracket 2111 by the plural bolts 2161 so as to be freely detachable therefrom.

Since the ball bearing 2113 is held by the upper bearing holder 2112, and the upper bearing holder 2112 is attached to the vehicle body frame 211 side by the bolts 2161 so as to be freely detachable therefrom, an assembly of the ball bearing 2161 and the upper bearing holder 2112 can be attached to the vehicle body frame side, or can be detached from the vehicle body frame side, thus making it possible to enhance the assembling workability.

An embodiment of the present invention provides the end coupling member 2108 of the steering shaft and the lower shaft 2104 of the actuator unit 277 side to be coupled to each other by the serrations.

Since the end coupling member 2108 and the lower shaft 2104 are coupled to each other by the serrations, a phase of the coupling of the end coupling member 2108 and the lower shaft 2104 can be finely adjusted by shortening a pitch of gears of the serrations and increasing the number thereof.

An embodiment of the present invention provides, as shown in FIG. 9, the self-aligning ball bearing 2186 is disposed on the lower end of the steering shaft and more specifically, of the output shaft 286.

Since the self-aligning ball bearing 2186 is disposed on the lower end of the steering shaft, the inclination of the steering shaft can be absorbed by the self-aligning ball bearing 2186. Thus, high accuracy is not required for the vehicle body frame 211, and the assembling of the steering shaft can be performed easily.

Note that, as shown in FIG. 4, the ball bearing 113 located above the actuator unit 77 is made self-aligning in this embodiment. However, without being limited to this, both of the ball bearing 113 located above the actuator unit 77 and the ball bearing 138 located below the actuator unit 77 may be made self-aligning.

The electric power steering device support structure of the present invention is suitable for a four wheeler.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electric power steering device support structure of a vehicle, comprising: an electric power steering device;
    a steering shaft attached to a vehicle body frame to be freely rotatable;
    an actuator unit provided on the steering shaft;
    a plurality of bearings for supporting the steering shaft on the vehicle body frame wherein at least one of the bearings self-aligning; and
    a holder attached to the vehicle frame, the holders holding the at least one self-aligning bearing,
    wherein the holder has an arcuate inner surface and an arcuate outer surface, and the at least one self-aligning bearing has an arcuate outer surface contacting the inner surface of the holder and a cylindrical inner surface contacting the steering shaft.

2. The electric power steering device support structure of a vehicle according to claim 1, wherein a pair among the bearings is arranged above and below a vicinity of the actuator unit.

3. The electric power steering device support structure of a vehicle according to claim 1, wherein the self-aligning bearing is disposed above the actuator unit.

4. The electric power steering device support structure of a vehicle according to claim 1, wherein the steering shaft and the actuator unit are coupled to each other by serrations.

5. The electric power steering device support structure of a vehicle according to claim 2, wherein the steering shaft and the actuator unit are coupled to each other by serrations.

6. The electric power steering device support structure of a vehicle according to claim 3, wherein the steering shaft and the actuator unit are coupled to each other by serrations.

7. The electric power steering device support structure of a vehicle according to claim 1, wherein the self-aligning bearing is disposed on a lower end of the steering shaft.

* * * * *